(12) United States Patent
Schibsbye et al.

(10) Patent No.: US 10,882,226 B2
(45) Date of Patent: Jan. 5, 2021

(54) METHOD FOR MANUFACTURING A COMPONENT FOR A WIND TURBINE

(71) Applicant: Siemens Gamesa Renewable Energy A/S, Brande (DK)

(72) Inventors: Karsten Schibsbye, Fredericia (DK); Henrik Stiesdal, Odense (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 790 days.

(21) Appl. No.: 14/587,241

(22) Filed: Dec. 31, 2014

(65) Prior Publication Data

US 2015/0251342 A1    Sep. 10, 2015

(30) Foreign Application Priority Data

Mar. 6, 2014   (EP) .................................... 14158094

(51) Int. Cl.
| | | |
|---|---|---|
| *B32B 5/20* | (2006.01) | |
| *B29C 44/12* | (2006.01) | |
| *B29C 70/44* | (2006.01) | |
| *B29C 70/34* | (2006.01) | |
| *B29C 70/08* | (2006.01) | |
| *B29C 44/36* | (2006.01) | |

(Continued)

(52) U.S. Cl.
CPC .......... *B29C 44/12* (2013.01); *B29C 44/1271* (2013.01); *B29C 44/362* (2013.01); *B29C 44/467* (2013.01); *B29C 70/081* (2013.01); *B29C 70/086* (2013.01); *B29C 70/342* (2013.01); *B29C 70/443* (2013.01); *B32B 5/20* (2013.01); *C08J 9/34* (2013.01); *B29K 2075/00* (2013.01); *B29K 2105/12* (2013.01); *B29L 2031/085* (2013.01); *C08J 2375/04* (2013.01); *Y02P 70/50* (2015.11)

(58) Field of Classification Search
CPC ....................................................... B32B 5/20
See application file for complete search history.

(56) References Cited

U.S. PATENT DOCUMENTS 5,336,349 A * 8/1994 Cornils ................. B05C 5/0216
156/107
5,429,066 A    7/1995 Rohan
(Continued)

FOREIGN PATENT DOCUMENTS

CN   103273662 A    9/2013
DE   10024814 A1    11/2001
(Continued)

OTHER PUBLICATIONS

CN Office Action dated Jan. 25, 2018, for CN patent application No. 201510099401.1.

*Primary Examiner* — Matthew J Daniels
*Assistant Examiner* — Patrick Butler
(74) *Attorney, Agent, or Firm* — Wolter Van Dyke Davis, PLLC

(57) ABSTRACT

A method for manufacturing a component for a wind turbine is provided. In a first step, a fiber material is laid onto a mold surface. In a further step, an uncured foam material is provided on top of the fiber material. Thereafter, the uncured foam material is cured to form a core member. Then, a resin impregnating the fiber material is cured to form the component. Thus, a core member for a component of a wind turbine can be provided easily.

18 Claims, 5 Drawing Sheets

(51) Int. Cl.
 B29C 44/46 (2006.01)
 C08J 9/34 (2006.01)
 B29L 31/08 (2006.01)
 B29K 105/12 (2006.01)
 B29K 75/00 (2006.01)

(56) References Cited

U.S. PATENT DOCUMENTS

| | | | | |
|---|---|---|---|---|
| 5,897,818 A * | 4/1999 | Lewit | ........................ | B32B 5/28 |
| | | | | 264/45.8 |
| 6,096,416 A * | 8/2000 | Altenberg | ................. | B32B 3/06 |
| | | | | 156/78 |
| 2009/0202776 A1* | 8/2009 | Brandon | ................... | B32B 3/18 |
| | | | | 428/56 |

FOREIGN PATENT DOCUMENTS

| | | | |
|---|---|---|---|
| EP | 0037987 | A2 | 10/1981 |
| WO | 2012025165 | A1 | 3/2012 |
| WO | 2013053666 | A1 | 4/2013 |

\* cited by examiner

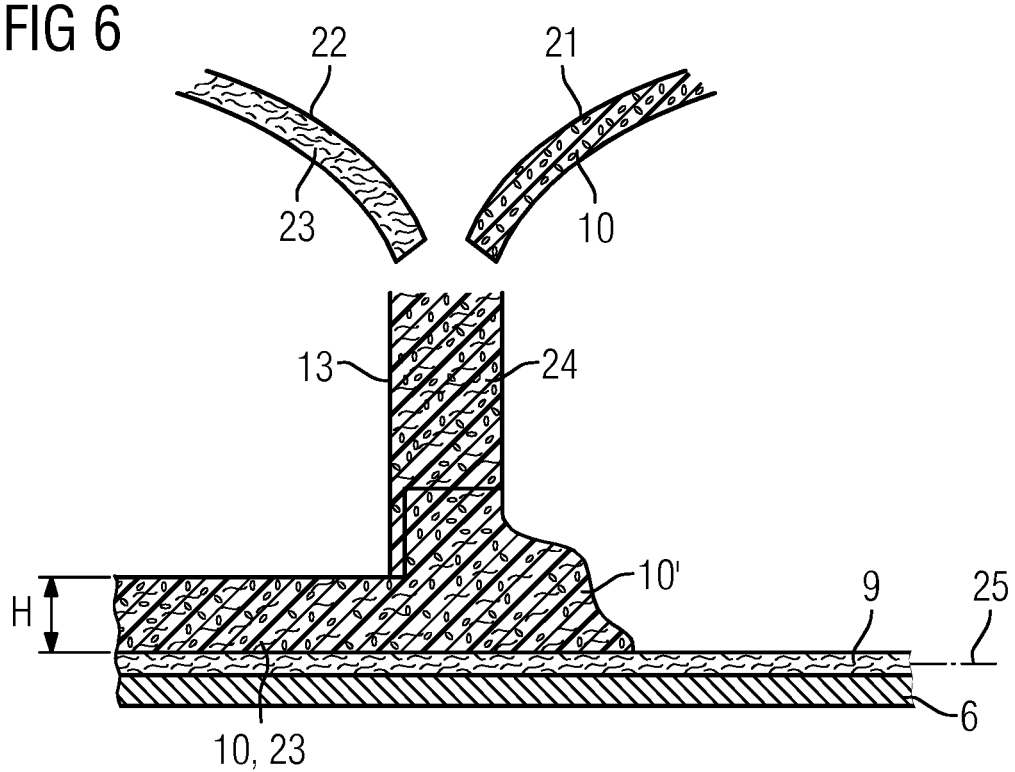

METHOD FOR MANUFACTURING A COMPONENT FOR A WIND TURBINE

CROSS REFERENCE TO RELATED APPLICATIONS

This application claims the benefit of European Application No. EP14158094 filed Mar. 6, 2014, incorporated by reference herein in its entirety.

FIELD OF INVENTION

The present invention relates to a method for manufacturing a component for a wind turbine.

BACKGROUND OF INVENTION

Modern wind turbine rotor blades are built from fiber-reinforced composites combined with core members, such as balsa wood or plastic foam. Examples of known plastic foams include polyvinyl chloride (PVC), polyethylene terephthalate (PET) and polybutylene terephthalate (PBT). The purpose of the balsa wood or plastic foam is to reduce weight in regions of the blade which are subjected only to a low mechanical stress during operation. In these regions, the blades comprise a sandwich design of fiber-reinforced composite and balsa wood or plastic foam. This is, for example, described in WO 2012/025165 A1.

When used in a resin transfer molding process (RTM), core members of this type need to be delivered to the mold. Next, one or more core members need to be cut or otherwise adapted to the required shape of the core. Then, the core members need to be arranged inside the mold, and care needs to be taken to avoid dislocation of the core members during further process steps, for example when covering the layup with a vacuum bag.

SUMMARY OF INVENTION

One objective of the present invention is to provide an approved method for manufacturing a component for a wind turbine.

Accordingly, a method for manufacturing a component for a wind turbine is provided. The method comprises: a) laying a fiber material onto a mold surface, b) providing an uncured foam material on top of the fiber material, c) curing the uncured foam material to form a core member, and d) curing a resin impregnating the fiber material to form the component.

The method is advantageous in that the uncured foam material can be easily delivered to the mold. For example, the uncured foam material takes the shape of a liquid, paste or foam. Foam materials of this kind may, for example, be stored at the mold in a tank or the like. Also, the uncured foam material can, without requiring any complex cutting operations, be adapted to take the shape of the desired core member. Furthermore, there is a small risk of the cured foam material changing its shape when accidentally bumped or pushed.

The fiber material may comprise fiber material of different shapes and composition. For example, the fiber material may comprise a layup of fibers, a fiber mat, a fiber fabric, woven fibers or a fiber felt. The fibers may be arranged unidirectionally in a biax-configuration or any other configuration. The fibers may comprise glass fibers, carbon fibers and/or aramid fibers, for example. The fiber material may be supplied in an unimpregnated state. In this case, the fiber material is impregnated with a resin before step d). For example, the resin may be injected into the fiber material in a resin transfer molding (RTM) or a vacuum-assisted resin transfer molding (VARTM)-process. In a VARTM process for example, the layup comprising the fiber material and the at least partially cured foam material are covered in a vacuum bag. In a further step, vacuum is applied to the region between the vacuum bag and the mold. Then, resin is injected in said region. After the resin has set or has been cured, the vacuum bag and/or the mold is removed and the final component is obtained. Generally speaking, the mold may be an open or a closed mold. For example, the mold may comprise one or more parts.

In step b), "on top of" also comprises "next to" or "adjacent" in cases where the fiber material is not arranged horizontally. Also, the uncured foam material may be applied directly to the fiber material. In other embodiments, another material or layers may be arranged between the uncured foam material and the fiber material, for example, a layer of balsa wood. By the same token, the fiber material does not need to be laid directly on the mold surface in step a), even though this may be the case. For example, a suction distribution layer, also referred to as a vacuum distribution layer, may be arranged between the fiber material and the mold surface.

The foam material comprises a plastic material, for example. "Uncured" refers to the foam material not being hardened and/or cross-linked at all or not to a substantial extent. Thus, the uncured foam material is soft and can be brought into the final shape of the core member requiring only small forces which can, for example, be exerted by hand.

"Cured" or "set" refers to the foam material being hardened and/or cross-linked to an extent where a shape of the core member will not or not significantly change during further process steps, for example when applying a vacuum to the layup comprising the fiber material and the core member.

Examples of a resin which may be used for impregnating the fiber material are epoxy, polyester, vinylester or any other suitable thermoplastic or duroplastic material.

"Layup" herein refers to one or more layers of fiber material.

According to an embodiment, in step b), the foam material is applied to the fiber material in a foamed condition.

For example, a polymer system may be used comprising two or more components, for example liquids. The components or liquids are mixed, which results in the components reacting with one another to produce the foam material in the foamed condition. Said foamed material is then applied to the fiber material.

In another embodiment, in step b), the foam material is applied to the fiber material in an unfoamed condition, the foamed condition being obtained after application of the uncured foam material to the fiber material.

For example, the foam material comprises a polymer system, the components or liquids being applied separately above the fiber material. Thus, foaming only starts after application. Or, according to another embodiment, the components or liquids of the polymer system are mixed, and then the mixture is applied on top of fiber material. However, the chemical reaction is timed such that foaming only substantially starts after the application of the mixture.

According to a further embodiment, in or after step b), the foam material is shaped in accordance with a desired geometry of the core member.

Advantageously, the foam material is shaped in its foamed condition. Yet, it is also possible to shape the foam material in its unfoamed condition. For example, the foam material may be provided as a paste. The paste can then be shaped in accordance with the desired geometry before foaming takes place.

According to a further embodiment, an applicator comprising a geometry corresponding to a desired geometry of the core member is moved across the foam material to shape the same.

The geometry of the applicator may, for example, be a triangular cutout or a zig-zag cutout. Or, the applicator may simply comprise a straight edge. In any case, the applicator is configured to spread out the foam material or scrape across the foam material to give it the desired shape.

According to a further embodiment, the applicator comprises an opening for supplying the uncured foam material.

For example, the opening is configured as a nozzle. Advantageously, the opening is in fluid communication with a supply line, supplying the foam material from a storage, for example from a tank. From the opening, the foam material is applied directly or indirectly onto the fiber material.

According to a further embodiment, the foam material is supplied through the opening of the applicator at the same time as the applicator is moved across the foam material that has already been applied to the fiber material.

In this way, the foam material is deposited and shaped in parallel, thus providing a fast manufacturing process.

According to a further embodiment, the applicator is configured to apply a covering layer on top of the foam material.

The covering layer or top layer may comprise paper, polypropylene (PP), glass fiber, carbon fiber or any other fiber material. For example, the applicator may comprise a reel or spool delivering the covering layer to the top of the deposited foam material as the applicator moves forward across the foam material or fiber material.

According to a further embodiment, in step b), the foam material comprises chopped fibers.

The chopped fibers may have a length ranging from a few millimeters to a few centimeters. The chopped fibers are mixed into the foam material before the foam material including the chopped fibers is applied to the fiber material. For example, the chopped fibers and the foam material are mixed in the applicator. For example, the applicator two supply lines, the first supply line supplying chopped fibers and a second supply line supplying the foam material. By adding the chopped fibers to the foam material, the core member formed is reinforced. In particular, the formed core member has increased compressive properties.

According to a further embodiment, at least some of the chopped fibers each have a length shorter than the height of the formed core member.

Some or all of the chopped fibers may have the mentioned length.

According to a further embodiment, at least some of the chopped fibers each have a length equal or larger than the height of the formed core member.

Some or all of the chopped fibers may have the mentioned length.

According to a further embodiment, at least some of the chopped fibers are orientated perpendicularly to the fiber material.

"Perpendicularly" herein comprises, for example, deviations from the normal direction of up to 10°, and up to 3° and further up to 1°.

According to a further embodiment, at least some of the chopped fibers are orientated non-perpendicularly to the fiber material.

For example, the chopped fibers can be orientated at 45° with respect to the plane of the fiber material. Also, layers or bars of the foam material may comprise chopped fibers at varying angles. For example, a first layer or bar of the foam material may comprise chopped fibers orientated at +45° with respect to the layer of fiber material, and a second layer or bar of the foam material may comprise chopped fibers orientated at −45° with respect to the layer of fiber material. The first and second layer or bar may be arranged in the same plane or in different planes with respect to each other.

According to a further embodiment, in step b), a strip of fiber material is provided between adjacent edges of layers of the foam material.

For example, the strip of fiber material may be a biax tape or a tape comprising unidirectional fibers. For example, the applicator may be configured to provide the strip between the two edges of layers of the foam material.

According to a further embodiment, the foam material is polyurethane (PU).

As an alternative, the foam material may comprise polyvinyl chloride (PVC), polyethylene terephthalate (PET) and/or polybutylene terephthalate (TBT).

"Wind turbine" presently refers to an apparatus converting the wind's kinetic energy into rotational energy, which may again be converted to electrical energy by the apparatus.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

BRIEF DESCRIPTION OF THE DRAWINGS

Further objects, features and advantages of the present invention become apparent from the subsequent description and depending claims, taken in conjunction with the accompanying drawings, in which:

FIG. 6 shows a method with some further modifications compared to FIG. 4;

In the Figures, like reference numerals designate like or functionally equivalent elements, unless otherwise indicated.

DETAILED DESCRIPTION OF INVENTION

Figure 1:
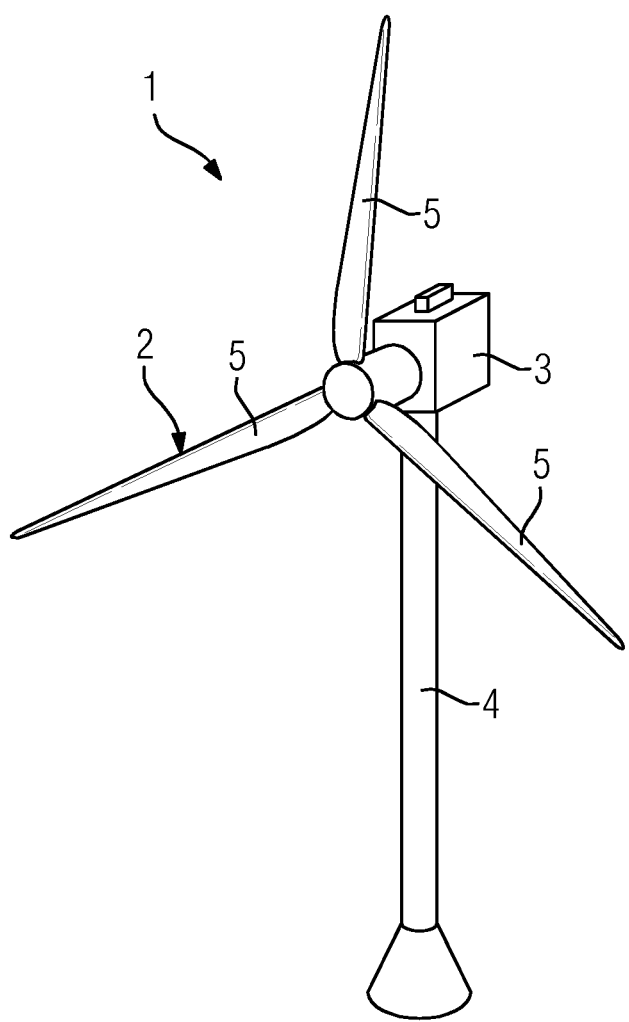
FIG. 1 is a perspective view of a wind turbine according to one embodiment.

FIG. 1 shows a wind turbine 1 according to an embodiment.

The wind turbine 1 comprises a rotor 2 connected to a generator (not shown) arranged inside a nacelle 3. The nacelle 3 is arranged at the upper end of a tower 4 of the wind turbine 1.

The rotor 2 comprises three blades 5. Rotors 2 of this kind may have diameters ranging from, for example, 30 to 120 meters. The blades 5 have an arcuate curvature and are subjected to high wind loads. At the same time, the blades 5 need to be lightweight. For these reasons, blades 5 in modern wind turbines 1 are manufactured from fiber-reinforced composite materials. Therein, glass fibers are generally preferred over carbon fibers for cost reasons. In addition, the blades 5 each comprise one or more core members made of a light material to reduce the weight of the blades 5. Presently, it is envisaged to manufacture the blades 5 with core members made from plastic foam, in particular polyurethane.

This process will hereinafter be described in more general terms referring to FIGS. 2 and 3 initially.

Figure 2:
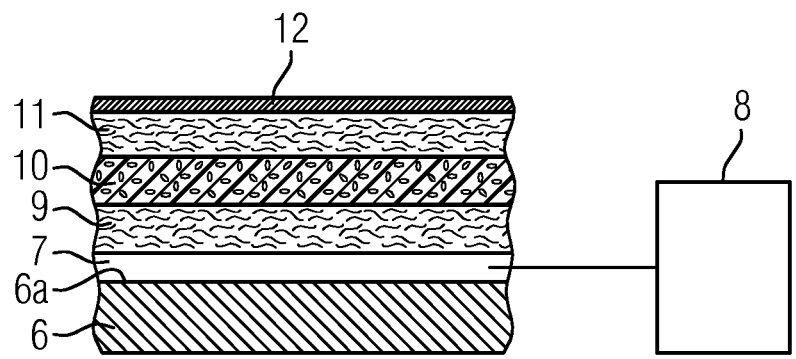
FIG. 2 shows a section view from a VARTM-process according to an embodiment of a method for manufacturing a component for a wind turbine.

FIG. 2 shows a mold 6, which may be configured as an open or closed mold. For example, the mold 6 may form a lower part of a closed mold, the upper part of the closed mold not being shown.

Initially, a vacuum distribution layer 7 is laid on top of a mold surface 6a, for example. The vacuum distribution layer 7 is connected to a vacuum pump 8, the function of which will be explained in more detail later.

Figure 3:
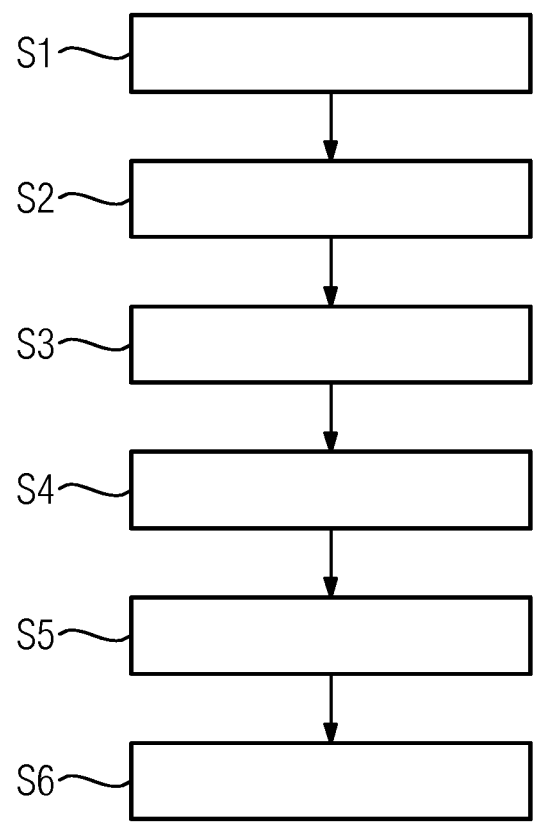
FIG. 3 shows a flowchart in accordance with an embodiment of a method for manufacturing a component for a wind turbine.

Now, in a first step S1 also illustrated in FIG. 3, a fiber material 9 is laid on top of the vacuum distribution layer 7. The fiber material 9 may, for example, comprise a fiber mat, a fiber layup, woven fibers or the like. The fibers may be arranged in a UD-configuration, a biax configuration or any other suitable configuration. The fiber material 9 comprises, for example, glass fibers and is applied to the vacuum distribution layer 7 in a dry state. In other embodiments, no vacuum distribution layer 7 is provided. In this case, the fiber material 9 is applied directly to the top surface 6a of the mold 6.

In a step S2, a foam material 10, in particular polyurethane, is applied on top of the fiber material 9. When the foam material 10 is applied to the fiber material 9, it is already in the foamed condition. In other embodiments, the foam material 10 may be of such a chemical composition that the foamed condition will only be obtained after the application of the foam material 10 on top of the fiber material 9.

In a further step S3, the foam material 10 is cured to form a core member. Curing may take place at room temperature or at an elevated temperature, for example, 100° C. During curing, molecular chains in the polyurethane are cross-linked to provide a hard and sturdy core member.

In another step, a further layer of fiber material 11 may be applied to the cured foam material 10.

Thereafter, the layup comprising the layers 7, 9, 10, 11 is covered in a vacuum bag 12. Now, suction is applied between the inner surface 6a of the mold 6 and the vacuum bag 12 to press the layup together. The suction is applied via the vacuum pump 8. The vacuum distribution layer 7 distributes the vacuum supplied by the vacuum pump 8. Once the vacuum has been applied, resin, for example an epoxy resin, is injected into the space between the vacuum bag 12 and the mold 6. The resin impregnates the fibers of the fiber materials 9, 11. Once the fibers of the fiber materials 9, 11 have been sufficiently wetted by the resin, heat is applied to the layup to cure the resin. The step of injecting the resin is indicated by step S4 in FIG. 3, the step of curing the resin to form a blade 5 is illustrated by step S5 in FIG. 3. In a step S6, the cured blade 5 may be removed from the mold 6.

In another embodiment, instead of the dry fiber materials 9, 11, pre-impregnated fiber material may be used. In this case, step S4 is not required.

Figure 4:
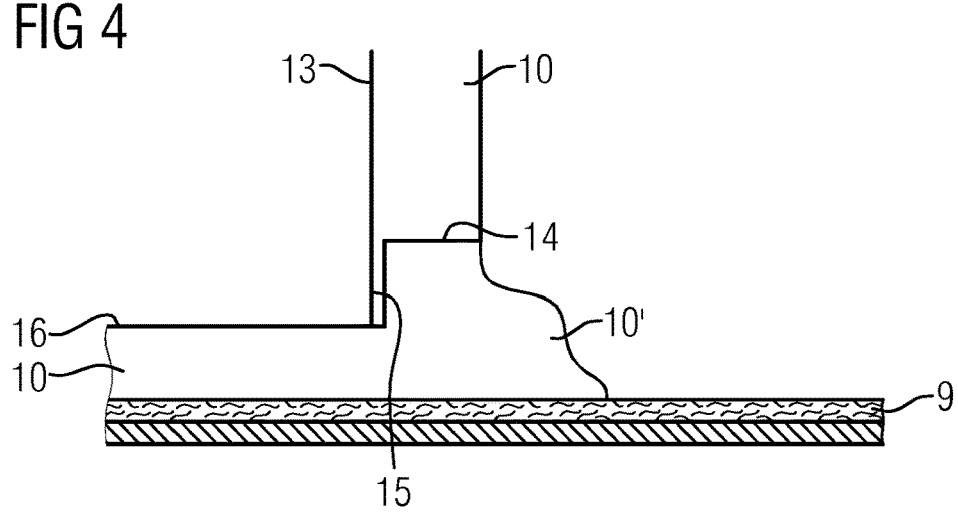
FIG. 4 shows a section view from a process step in accordance with an embodiment of a method for manufacturing a component for a wind turbine.

FIG. 4 shows a more specific example of how to implement step S2.

An applicator 13 is used to apply the foam material 10. The applicator 13 is connected to a supply line (not shown) supplying the foam material 10 in a foamed condition from a tank or some other storage means.

The applicator 13 has an opening 14, which may be configured as a nozzle, for example. Through the nozzle 14, the foam material 10 is applied on top of the fiber material 9. The applicator 13 also comprises a scraping edge 15 for shaping the foam material 10' that has already been deposited on the fiber material 9. In this manner, a layer of foam material 10 is obtained having a flat or planar top surface 16.

Figure 5A:
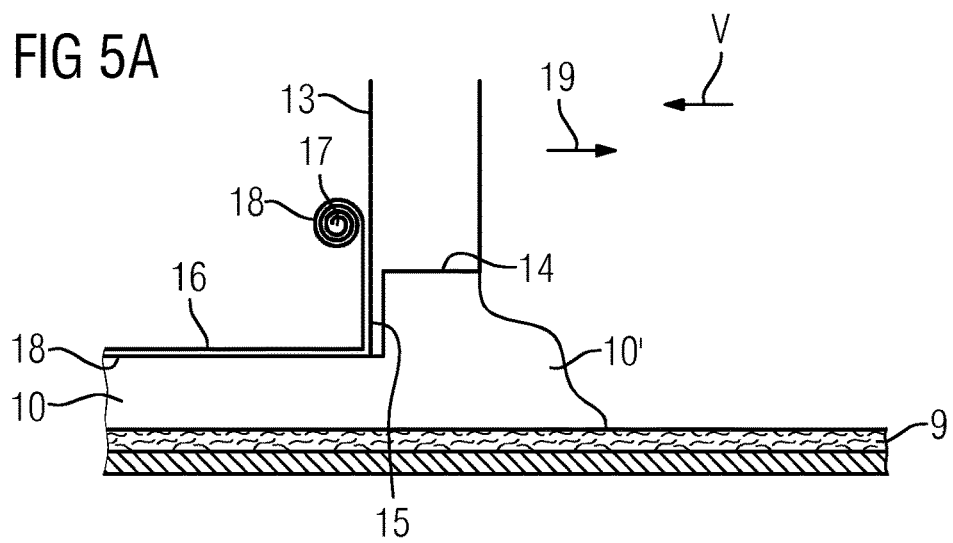
FIG. 5A to FIG. 5C show a method with some modifications compared to the method of FIG. 4.
Figure 5B:
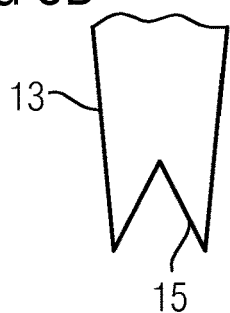
Figure 5C:
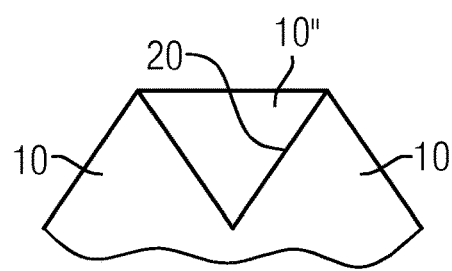

FIGS. 5A to 5C describe the process illustrated by FIG. 4 with some modifications.

According to FIG. 5A, the applicator 13 comprises a reel or spool 17. The spool 17 comprises wound-up paper 18, for example. The paper 18 is automatically deposited on the top surface 16 of the foam material 10, as the applicator 13 deposits the foam material 10 on top of the fiber material 9 and shapes the same with its scraping edge 15. The applicator 13 basically moves parallel to the plane, in which the fiber material 9 extends. The direction of motion of the applicator 13 is indicated by reference numeral 19 in FIG. 5A.

According to one embodiment, the scraping edge 15 may have the shape of a triangular cutout as shown in FIG. 5B. As the applicator 13 moves over the deposited foam material 10', the foam material 10 is formed to a corresponding triangular shape. This is illustrated by FIG. 5C, which shows, in a cross-section, two triangular bars of foam material 10 arranged next to one another in a plane parallel to the plane of the fiber material 9. The applicator 13 may now be configured to fill up the triangular recess 20 between the triangular bars with foam material 10" in a further process step. In this further process step, the applicator 13 may be configured with a straight scraping edge 15, as for example explained in connection with FIG. 4.

FIG. 6 shows a process step with some further modifications compared to FIG. 4.

In the process illustrated in FIG. 6, the applicator 13 is connected to two supply lines 21, 22. Via the supply line 21, the foam material 10 is supplied. Via the supply line 22, chopped fibers 23, for example chopped glass, carbon or aramid fibers 23, are supplied. Further, the applicator 13 may comprise a mixing chamber 24, in which the foam material 10 is mixed with the chopped fibers 23. Said mixture is supplied by the applicator 13 onto the fiber material 9. Further embodiments described with respect to FIG. 4 as well as FIG. 5A to 5C apply mutatis mutandis to the embodiment of FIG. 6.

Once cured, the foam material 10 is reinforced by the fibers 23. The fibers 23 may have a length smaller, equal or larger than the thickness or height H of the deposited layer 10. Thus, a fiber-reinforced core member is obtained of the curing.

Also, the fibers may be arranged at different angles with respect to the plane 25 of the glass fiber material 9.

The fibers 23, in particular a majority of the fibers 23, may be arranged perpendicularly to the plane 25.

Figure 7:
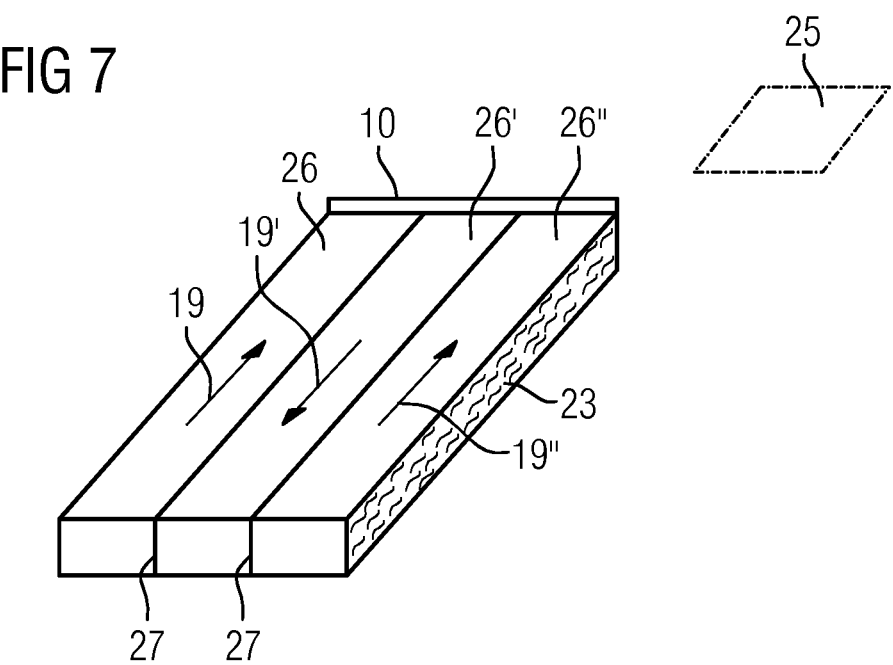
FIG. 7 shows, in a perspective view, adjacent bars or layers of foam material.

FIG. 7 illustrates an example of a foam material 10 with different fiber orientations.

In the example of FIG. 7, the fibers 23 are arranged at a non-perpendicular angle with respect to the plane 25 of the fiber material 9 (not shown). For example, the fibers 23 may be arranged at angles of +45°/−45° with respect to the plane 25.

For example, the foam material 10 may be comprised of three bars or layers 26, 26', 26". The bars or layers 26, 26', 26" are arranged next to each other, thus bordering with their side faces or edges 27 onto one another. The bars or layers 26, 26', 26" may be formed by the applicator 13 changing its direction of movement 19, 19', 19" two times by 180°.

Figure 8:
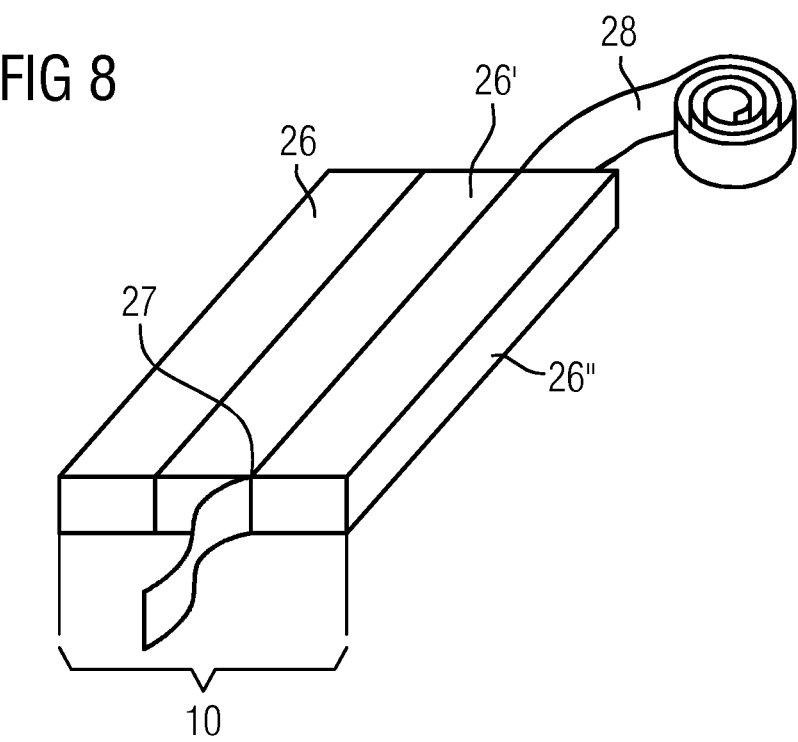
FIG. 8 shows, in a perspective view, adjacent bars of bars or layers of foam material and a fiber strip or tape.

FIG. 8 illustrates a further method of reinforcing the foam material 10.

For example, the foam material 10 may again, as already described in connection with FIG. 7, be comprised of several bars or layers 26, 26', 26" being arranged side by side. Now, a fiber strip 28 comprising a biax fiber material, for example, is arranged between adjacent edges 27 of the bars or layers 26, 26', 26". The strip or tape 28 may be arranged such that it extends in a plane perpendicular to the plane 25 of the fiber material 9.

Although the present invention has been described in accordance with preferred embodiments, it is obvious for a person skilled in the art that modifications are possible in all embodiments.

The invention claimed is:

1. A method for manufacturing a blade for a wind turbine, comprising
   a) laying a fiber material onto one of a vacuum distribution layer and a surface of a mold,
   b) providing an uncured foam material to the mold and on top of the fiber material,
   c) curing the uncured foam material in the mold to form a core member,
   d) impregnating the fiber material with a resin; and
   e) curing the resin impregnating the fiber material to form the blade in the mold;
   wherein in or after step b) the mold has an arcuate curvature to shape the foam material in accordance with a desired geometry of the blade;
   wherein step b) is performed by an applicator comprising a geometry corresponding to the desired geometry of the blade, and wherein said applicator is moved across the mold and the foam material to shape the foam material.

2. The method of claim 1, wherein in step b) the uncured foam material is applied to the fiber material in a foamed condition.

3. The method of claim 1, wherein in step b) the uncured foam material is applied to the fiber material in an unfoamed condition, the foamed condition being obtained after application of the uncured foam material to the fiber material.

4. The method of claim 1, wherein the applicator comprises an opening for supplying the uncured foam material.

5. The method of claim 4, wherein the foam material is supplied to the opening of the applicator at the same time as the applicator is moved across applied foam material that has already been applied to the fiber material.

6. The method of claim 4, wherein the geometry of the applicator comprises a scraping edge that is aligned with the opening.

7. The method of claim 1, wherein the applicator is configured to apply a covering layer on top of the foam material.

8. The method of claim 1, wherein in step b) the uncured foam material comprises chopped fibers.

9. The method of claim 8, wherein at least some of the chopped fibers each have a length less than the height of the formed core member.

10. The method of claim 1, further comprising laying a further fiber material on the cured foam material in the mold after step c).

11. The method of claim 1, wherein in step b) a strip of fiber material is provided between adjacent edges of layers of the uncured foam material.

12. The method of claim 1, wherein the foam material is polyurethane.

13. The method of claim 1, wherein step a) comprises laying the fiber material onto the vacuum distribution layer and wherein the method further comprises:
   laying the vacuum distribution layer onto the mold surface prior to step a);
   connecting the vacuum distribution layer to a vacuum pump;
   covering the vacuum distribution layer, the fiber material, and the foam material with a vacuum bag;
   applying suction between the mold surface and the vacuum bag with the vacuum pump.

14. The method of claim 13, further comprising:
   injecting resin between the mold surface and the vacuum bag after the applying suction step;
   applying heat to perform step e) and form the blade of the wind turbine;
   and removing the blade of the wind turbine from the mold after step e).

15. The method of claim 1, wherein step b) comprises:
   supplying foam material through a first supply line of the applicator to a mixing chamber;
   supplying chopped fibers through a second supply line of the applicator to the mixing chamber;
   mixing the foam material and the chopped fibers in the mixing chamber;
   supplying a mixture of the foam material and the chopped fibers from the mixing chamber to the top of the fiber material.

16. The method of claim 1, wherein the geometry of the applicator essentially includes a scraping edge and wherein the desired geometry of the foam material is a flat or planar top surface.

17. The method of claim 1, wherein the geometry of the applicator comprises a triangular cutout or zig-zag cutout and wherein the desired geometry of the foam material comprises a triangular shape.

18. The method of claim 17, wherein the desired geometry comprises a triangular recess and wherein the method further comprises providing the uncured foam material with the applicator to fill up the triangular recess after step b).

* * * * *